United States Patent [19]

Shaffer

[11] 3,731,012

[45] May 1, 1973

[54] CURRENT LIMITING AND RESISTANCE MONITORING CIRCUIT

[75] Inventor: William E. Shaffer, Rochester, N.Y.

[73] Assignee: Stromberg-Carlson Corporation, Rochester, N.Y.

[22] Filed: Sept. 30, 1971

[21] Appl. No.: 185,180

[52] U.S. Cl. ................................................ 179/175.3

[51] Int. Cl. ................................................ H04b 3/46

[58] Field of Search ........................ 179/175, 175.1 R, 179/175.3, 175.11; 324/64, 62 R

[56] References Cited

UNITED STATES PATENTS 3,541,436 11/1970 Haggan .............................. 324/62 R 2,891,219 6/1959 Camp ................................ 324/62 R 3,646,436 2/1972 Chan .................................... 324/64

3,566,233 2/1971 Kahn .................................... 324/64

*Primary Examiner*—Kathleen H. Claffy

*Assistant Examiner*—Douglas W. Olms

*Attorney*—Charles C. Krawczyk

[57] ABSTRACT

A current limiting and resistance monitoring circuit provides a means for limiting the amount of current flow to a telephone connection connected thereto and for generating a control signal having a level that is a function of the resistance of the telephone connection.

5 Claims, 1 Drawing Figure

Patented May 1, 1973 3,731,012
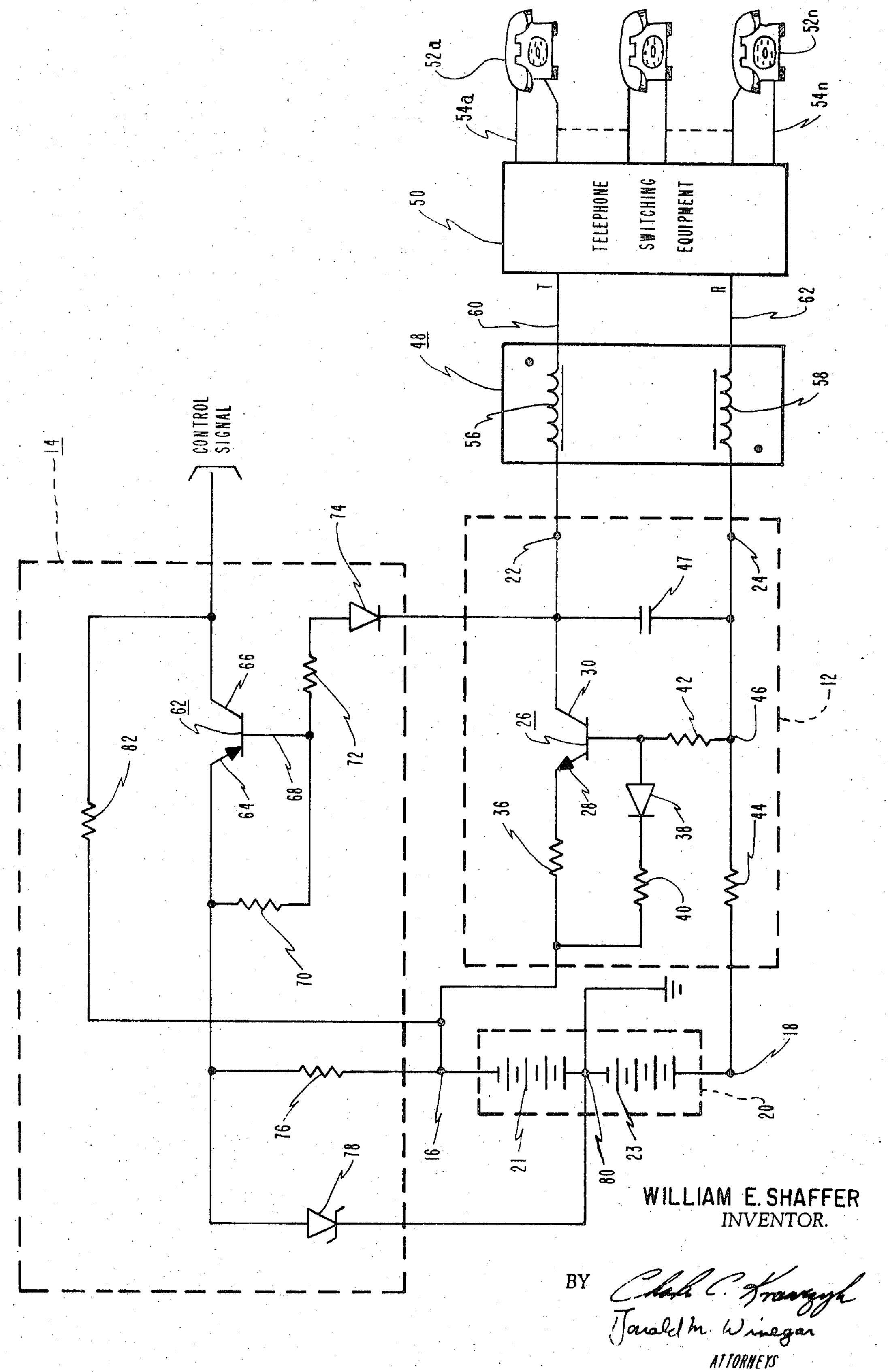
WILLIAM E. SHAFFER
INVENTOR.
BY Chas. C. Krawczyk
Jerald M. Winegar
ATTORNEYS

CURRENT LIMITING AND RESISTANCE MONITORING CIRCUIT

BACKGROUND OF THE INVENTION

This invention pertains to circuits for monitoring the resistance of telephone connections and, more particularly, to circuits for controlling the current in short and long line telephone connections and providing a signal that is a function of the resistance of the connection.

The telephone line selector and connector circuits in step-by-step systems, and junctor and trunk circuits in common control systems, supply an operating line current to the telephone connections between a central office and a subscriber telephone set. A function of these circuits is to introduce talking battery or line current to the telephone circuit or set, and to respond to on-hook and off-hook conditions and dial pulses, to provide signalling and supervision between the subscriber and the central office. One of the problems with conventional circuit arrangements is the variation of line current due to differences in the loop resistance of the line for varying lengths of lines between the central office and the subscriber.

Telephone sets located on the subscriber premises are connected to a central office by two metallic conductors, generally called a telephone line. Such telephone lines vary in length depending upon the distance between the subscriber premises and the central office. The resistance of the line increases as the length of the telephone line increases. Furthermore, due to the high cost of copper, there is a general tendency to use smaller diameter conductors to reduce cost, resulting in a higher resistance per unit length. Hence, with smaller diameter wires, the resistance of the telephone lines becomes an increasingly important factor in determining the power and signal attenuation in telephone lines. If the resistance of the line exceeds approximately 1,500 ohms (generally considered a long line), provisions must be made in the central office to assure the high resistance of the long telephone line does not affect the proper operation of the telephone set and the connections thereto.

The proper operation of a long line subscriber telephone connection necessitates at least two requirements. One requirement is that sufficient battery potential must be provided to the telephone set to assure efficient operation of the receiver and transmitter and to assure proper signalling. A second requirement is that adequate means must be provided to replace the audio frequency energy lost due to long line attenuation. Equipment suitable for meeting these two requirements could be provided on each individual long line basis, but this method is expensive and requires additional space in associated central office telephone equipment. Equipment suitable for meeting these two requirements could also be provided on a per group of telephone lines basis, often called common mode operation. This proves undesirable since this approach restricts the connection of long telephone lines to particular line groups.

Repeaters cannot be indiscriminately connected into long line and short line connections. If repeaters or amplifiers are connected into short line connections, the repeaters may break into oscillation or cause undesirable echo effects. Therefore, if repeaters are to be provided for circuits that can be connected to long and short lines, then apparatus is required to determine whether the connection is or is not a long line connection.

It is, therefore, an object of this invention to provide a new and improved circuit for monitoring the resistance of a telephone connection and for generating a control signal in response thereto.

Another object of this invention is to provide a new and improved circuit for a telephone system, including switching equipment for making telephone connections to telephone sets via various long and short telephone lines having different line resistances, for determining when a telephone connection includes a long telephone line and for generating a signal in response to the connection including the long telephone line.

Other objects of this invention will, in part, be obvious and will, in part, appear hereinafter.

BRIEF DESCRIPTION OF THE INVENTION

In accordance with the teachings of this invention, there is provided a circuit for limiting the amount of current in a telephone connection and providing a signal that is a function of the resistance of the connection. First circuit means is connected in series with the telephone connection and is responsive to the resistance of the telephone connection for limiting the amount of direct current flow in the telephone connection within a preset range. The circuit also comprises second circuit means connected to the current limiting means that is responsive to the potential drop across the current limiting circuit for providing a signal that is a function of the resistance of the telephone connection.

DESCRIPTION OF THE DRAWING

The FIGURE includes a schematic diagram of a circuit for limiting the amount of current flow in a telephone connection and providing a signal which is a function of the resistance of the telephone connection and is made in accordance with the teachings of this invention.

DESCRIPTION OF THE PREFERRED EMBODIMENT

Referring now to FIG. 1, there is shown a circuit for limiting the flow of current through a telephone loop connection and for monitoring the resistance thereof. The circuit comprises a current limiting circuit 12 for supplying a substantially constant current not exceeding a preset maximum magnitude to the telephone loop connection and a detector circuit 14 for monitoring the resistance of the connected telephone loop connection and generating a control signal which is a function of the resistance of the connected telephone loop connection.

The current limiting circuit 12 comprises a first pair of terminals 16 and 18 for connection to a direct current power source 20. The power source 20 may, for example, comprise two or more batteries 21 and 23, as determined by the system's voltage requirements. The circuit 12 allows the use of a higher potential power supply at the central office to assure that sufficient current is available for properly energizing telephone sets via long line (high resistance) connections and also limits the current provided by the power source to desirable operating limits when connected via short line (low resistance) connections. A second pair of terminals 22 and 24 provide a means for connecting a telephone loop connection to the circuit 12. Connected between the two pairs of terminals is a control device 26, such, for example, as a transistor, having first and second terminals 28 and 30 (emitter and collector, respectively), defining a controllable current path therebetween. A third terminal 32 (base) of the device 26 controls the current flow through the controllable path. The collector 30 is connected to the terminal 22. The emitter 28 is connected to the terminal 16 through a resistor 36. The base is connected through a unidirectional series biasing circuit (comprising a diode 38 and a resistor 40) to the terminal 16, and through a pair of resistors 42 and 44, respectively, to the terminal 18. A connection is made between the junction 46 of the two resistors 42 and 46 and the terminal 24. A capacitor 47 is connected across the terminals 22 and 24.

The telephone connection includes a battery feed device 48, such, for example, as a dual coil relay or a saturable reactor (such as, a calling battery or answer battery relay or reactor), telephone switching equipment 50, and any one of the plurality of telephone sets 52*a*–52 individually connected to the telephone switching equipment 50 via corresponding telephone lines 54*a*–54*n*. The power source 20 is connected through the current limiting circuit 12 to the dual coil relay 48 for connection through the telephone switching equipment 50 to any one of the plurality of telephone sets 52*a*–52*n* via its corresponding telephone lines 54*a*–54*n*. The dual coil relay 48 has one end of a first coil 56 connected to the terminal 22 of the circuit 12 and the other end connected to the telephone switching equipment 50. One end of a second coil 58 of the relay 48 is connected to the terminal 24 and the other end is connected to the telephone switching equipment 50. Leads 60 and 61 interconnecting the relay 58 and the equipment 50 represent the tip and ring leads, respectively, of the telephone loop connection.

For example, assume that the one of the telephone lines a–54*n* connected to the telephone switching equipment 50 is a short line connection (low resistance). A low resistance is therefore applied across the pair of terminals 22 and 24. A result of the application of a low resistance across the terminals 22 and 24 is that the potential drop across the two resistors 36 and 44 is in a direction to render the transistor 26 less conductive than with a long line connection. Consequently, a greater potential drop is experienced across the resistor 36 and the transistor 26 than with a long line connection, thereby reducing the potential appearing across the pair of terminals 22 and 24. The maintains reduction in the potential appearing across the terminals 22 and 24 thereby maintains the flow of current to the short line telephone connection within a desired range.

Should the one of the telephone lines 54*a*–54*n* connected to the telephone switching equipment 50 be a long line (high resistance) connection, then the potential drop across the resistors 36 and 44 renders the transistor 26 more conductive than with a short line connection, and therefore a lesser potential drop is experienced across the series combination of the resistor 36 and the transistor 26 increasing the potential appearing across the pair of terminals 22 and 24. The increase in potential appearing across the terminals 22 and 24, thereby maintains the flow of current to the long line telephone connection within the desired range.

However, should the one of the telephone lines 54*a*–54, connected to the telephone switching equipment 50, be a very long line (very high resistance) connection, the circuit 12 functions to forward bias sufficiently to saturate the transistor 26. As a result of the transistor 26 reaching saturation, the maximum potential available is applied to the connected telephone loop connection and the flow of current therein is now effectively determined by the resistance of the connected very long telephone line. Another example of this type of circuit is disclosed in the U.S. Pat. No. 3,035,122, entitled "Constant Current Line Circuit For Loop Telephone Line" and issued to J.K. Livingstone, In each of these previous examples, it should be noted that the potential drop across the series combination of the resistor 36 and the emitter 28 and the collector 30 (the controllable current path of transistor 26) is an inverse function of the resistance of the telephone circuit connection connected to the pair of terminals 22 and 24.

The potential drop across the series circuit including the resistor 36 and the transistor 26 can be utilized to generate a control signal to perform a variety of functions. Included among these functions are connecting and disconnecting additional DC power sources to the connected telephone line connection and providing a means for controlling the amplification of AC signals in the connected telephone line connection when required.

The detector circuit 14 is connected across the series circuit including the transistor 26 and the resistor 36. The circuit 14 comprises a control device 62 such, for example, as a transistor, having first and second terminals 64 and 66 (emitter and collector, respectively) defining a controllable current path therebetween. A third terminal 68 (base) of the device 62 controls the current flow through the controllable path. The base 68 is connected through a resistor 70 to the emitter 64, and by a unidirectional circuit comprising a resistor 72 series connected to a diode 74 to the collector 30 of the device 26. The emitter 64 is connected through a resistor 76 to the terminal 16 of the power source 20. Additionally, a zener diode 78 is connected between the emitter 64 and a grounded terminal 80 of the power source 20 to provide a constant biasing potential. The collector 66 of the transistor 62 is connected through a resistor 82 to the terminal 16.

Hence, it can be seen that the transistor 62 of the detector circuit 14 is biased by the potential drop across the series circuit including the transistor 26 and the resistor 36. Since the aforesaid potential is an inverse function of the resistance of the telephone connection connected to the current limiting circuit 12, the magnitude of the current flow through the transistor 62 is an inverse function of the resistance of the connected telephone loop connection. When the potential across the series circuit increases, the biasing potential to the transistor 62 increases and more current flows through the controllable current path of the device 62. Therefore, the voltage drop across the resistor 82 increases. When the potential across the monitored series circuit decreases (because the resistance of the connected telephone loop connection has increased), the voltage drop across the resistor 82 decreases indicating the higher resistance condition. The potential, or control signal at the collector 66 (relative to ground) is therefore a direct function of the resistance of the connected telephone loop connection.

The potential, or control signal, at the collector 66 therefore can be utilized as a control signal to actuate a switching circuit, which, in turn, will connect or disconnect, as required, a suitable device such, for example, as a power source or an amplification means to control a function in the connected telephone loop connection. An example of such suitable means for utilizing the control signal, and the circuitry producing the same, is described in the copending U.S. Pat. application, Ser. No. 185,228, entitled "Amplifier Select and Control Circuit", by William E. Shaffer and Charles C. Krawczyk, and filed on Sept. 30, 1971.

What is claimed is:

1. A circuit for limiting the amount of direct current flow in a telephone loop connection and providing a signal that is a function of the resistance of the telephone loop connection comprising:

current limiting circuit means for connection in series with a direct current power source and a telephone loop connection, responsive to the resistance of the telephone loop connection, for limiting the amount of direct current flow therein within a preset range, and circuit means connected to said current limiting circuit means, responsive to the potential drop across the current limiting circuit means, for providing a signal that is a function of the resistance of the telephone loop connection.

2. A circuit for limiting the flow of current through a telephone loop connection and for monitoring the resistance thereof comprising:

a first pair of terminals for connection to a direct current power source;

a second pair of terminals for connection to a telephone loop connection including a direct current path;

a first and a second control device, each having first and second terminals defining a controllable current path therebetween and a third terminal for controlling the current flow through the controllable path;

first circuit means for connecting the first, the second and the third terminals of said first control device between said first and said second pairs of terminals so that said first control device limits the amount of current flow to the telephone loop connection connected across said second pair of terminals and having the first and the second terminals of said first control device defining a series circuit between one of the terminals of each of said first and said second pairs of terminals, and second circuit means for connecting the first and the third terminals of said second control device across at least a portion of said series circuit so that said second control device provides a signal that is a function of the resistance of the telephone loop connection across the second pair of terminals.

3. A circuit as defined in claim 2 wherein:

said control devices are transistors, and said first, said second and said third terminals of said devices are respectively the emitter, the collector, and the base of the transistors.

4. A circuit as defined in claim 3 wherein:

the emitter and the collector of the transistor corresponding to the first control device define the controllable current path and the base of said transistor provides a biasing signal responsive to the resistance of the telephone loop connection to limit the current flow through the telephone loop connection within a preset range.

5. A circuit as defined in claim 4 wherein the emitter and the base of the transistor corresponding to said second control device are connected across the series circuit including the transistor corresponding to the first control device so that a signal is generated at the collector of the transistor which corresponds to said second control device which is a function of the resistance of the telephone loop connection.

* * * * *

UNITED STATES PATENT AND TRADEMARK OFFICE

CERTIFICATE OF CORRECTION

PATENT NO. : 3,731,012

DATED : May 1, 1973

INVENTOR(S) : William E. Shaffer

It is certified that error appears in the above-identified patent and that said Letters Patent are hereby corrected as shown below:

| | |
|---|---|
| Col. 3, line 28 | "52a-52" should read ---52a-52n---. |
| line 47 | "a-54n" should read ---54a-54n---. |
| line 59 | Delete "maintains" |
| Col 4, line 10 | "54a-54" should read |

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*